United States Patent
Zheng

(10) Patent No.: US 7,928,891 B2
(45) Date of Patent: Apr. 19, 2011

(54) GPS WITH RADAR DETECTOR

(76) Inventor: Edward Zheng, La Verne, CA (US)

( * ) Notice: Subject to any disclaimer, the term of this patent is extended or adjusted under 35 U.S.C. 154(b) by 0 days.

(21) Appl. No.: 12/284,223

(22) Filed: Sep. 18, 2008

(65) Prior Publication Data

US 2009/0072118 A1    Mar. 19, 2009

Related U.S. Application Data

(60) Provisional application No. 60/994,427, filed on Sep. 18, 2007.

(51) Int. Cl.
*G01S 7/40* (2006.01)
*G01S 13/86* (2006.01)
*G01S 13/00* (2006.01)

(52) U.S. Cl. ............ 342/20; 342/13; 342/175; 342/176; 701/200; 701/207; 701/213

(58) Field of Classification Search ............. 342/13–20, 342/89, 175, 357.01–357.17, 176, 195, 350, 342/352, 357.21, 357.22, 357.25; 701/200–225, 701/1, 70, 93–98; 439/296–298, 374; 359/838, 359/871–883; 248/682–688, 200, 274.1, 248/288.11–297.51, 466, 489, 495, 496; 455/73, 550.1, 561, 575.1–575.9, 7, 11.1, 455/12.1, 13.1–13.4; 362/459, 487, 494
See application file for complete search history.

(56) References Cited

U.S. PATENT DOCUMENTS

| | | | | |
|---|---|---|---|---|
| 5,977,884 A * | 11/1999 | Ross | ........................ | 342/357.07 |
| 6,201,493 B1 * | 3/2001 | Silverman | ...................... | 342/20 |
| 6,204,798 B1 * | 3/2001 | Fleming, III | .................... | 342/20 |
| 6,662,106 B2 * | 12/2003 | Evans | ........................... | 701/210 |
| 6,670,905 B1 * | 12/2003 | Orr | ................................. | 342/20 |
| 6,675,085 B2 * | 1/2004 | Straub | ............................ | 701/93 |
| 6,895,324 B2 * | 5/2005 | Straub | ............................ | 701/93 |
| 6,939,155 B2 * | 9/2005 | Postrel | .......................... | 439/297 |
| 6,985,753 B2 * | 1/2006 | Rodriguez et al. | .......... | 455/550.1 |
| 7,293,888 B2 * | 11/2007 | Hutzel et al. | .................. | 359/871 |
| 7,301,494 B2 * | 11/2007 | Waters | ............................ | 342/20 |
| RE40,653 E * | 3/2009 | Fleming, III | .................... | 342/20 |
| 2002/0152026 A1 * | 10/2002 | Evans | .......................... | 701/210 |
| 2003/0139150 A1 * | 7/2003 | Rodriguez et al. | ........... | 455/12.1 |
| 2003/0218562 A1 * | 11/2003 | Orr | ................................. | 342/20 |
| 2004/0107037 A1 * | 6/2004 | Straub | ............................ | 701/93 |
| 2005/0121579 A1 * | 6/2005 | Rim et al. | ...................... | 248/495 |
| 2005/0242984 A1 * | 11/2005 | Waters | ............................ | 342/20 |
| 2005/0277322 A1 * | 12/2005 | Postrel | .......................... | 439/297 |
| 2006/0002123 A1 * | 1/2006 | Hutzel et al. | .................. | 362/494 |

* cited by examiner

*Primary Examiner* — Bernarr E Gregory

(74) *Attorney, Agent, or Firm* — Raymond Y. Chan; David and Raymond Patent Firm

(57) ABSTRACT

A GPS system includes a frame having a window, a GPS navigator supported by the frame, wherein a display of the GPS navigator is facing opposite to the window of the frame, a radar detector received in the frame to align with the window thereof, and an attaching element attaching the GPS system to an interior side surface of a vehicle such that the display of the GPS navigator is rearwardly facing towards the driver while the radar detector is forwardly sending out detecting signal through the window of the frame. The GPS system integrates the two important driving assistant equipments together, occupies minimal mounting space, and utilize only one car power outlet.

20 Claims, 6 Drawing Sheets

GPS WITH RADAR DETECTOR

CROSS REFERENCE TO RELATED APPLICATION

This is a non-provisional application of a Provisional Application having an Application No. 60/994,427 and a filing date of Sep. 18, 2007.

BACKGROUND OF THE PRESENT INVENTION

1. Field of Invention

The present invention relates to a GPS with a radar detector and more particularly to a mount which contains a radar detector and holds a portable vehicle GPS navigator.

2. Description of Related Arts

Global Positioning System (GPS) navigator is becoming smaller and smaller, and is much more affordable in price. It is already widely used in all different vehicles. Many new models of vehicles have the option of preinstalled GSP navigator. But for those vehicles without preinstalled GPS navigator, mounting a portable GPS navigator is an obvious solution.

Currently, most GPS navigator products are using mounts, such as suction mounts to install the GPS navigators on the vehicles. The suction mount is attached to the windshield or on the dashboard to give a stable support. An adjustable connecter connects the mount and the navigator in an adjustable manner so the driver can adjust the navigator's position to let the screen face to him or her. Also the car cigarette lighter provides the power to the GPS navigator.

But many vehicles have some other mounted equipment which needs to take some place on the windshield or the dashboard, for example, radar detectors. If each equipment takes some space for installation, it unavoidably will limit the driver's view field which is very danger for driving. There is a need to integrate those individual equipments and maximally reduce the place taking by the installation.

SUMMARY OF THE PRESENT INVENTION

An object of the present invention is to provide a GPS system to mount a GPS navigator and a radar detector together in a vehicle.

Another object of the present invention is to provide a GPS system to reduce the place taken by installation.

Another object of the present invention is to provide a GPS system which has the screen of the navigator to face the driver, and has the radar detector window to face the front of the vehicle.

Another object of the present invention is to provide a GPS system which allows the GPS navigator be mounted and removed easily.

In order to accomplish the above objects, the present invention provides a GPS system which comprises:

a frame having a window;

a GPS navigator supported by the frame, wherein a display of the GPS navigator is facing opposite to the window of the frame;

a radar detector received in the frame to align with the window thereof; and an attaching element attaching the frame to an interior side surface of a vehicle such that the display of the GPS navigator is rearwardly facing towards the driver while the radar detector is forwardly sending out detecting signal through the window of the frame.

These and other objectives, features, and advantages of the present invention will become apparent from the following detailed description, the accompanying drawings, and the appended claims.

DETAILED DESCRIPTION OF THE PREFERRED EMBODIMENT

Figure 1:
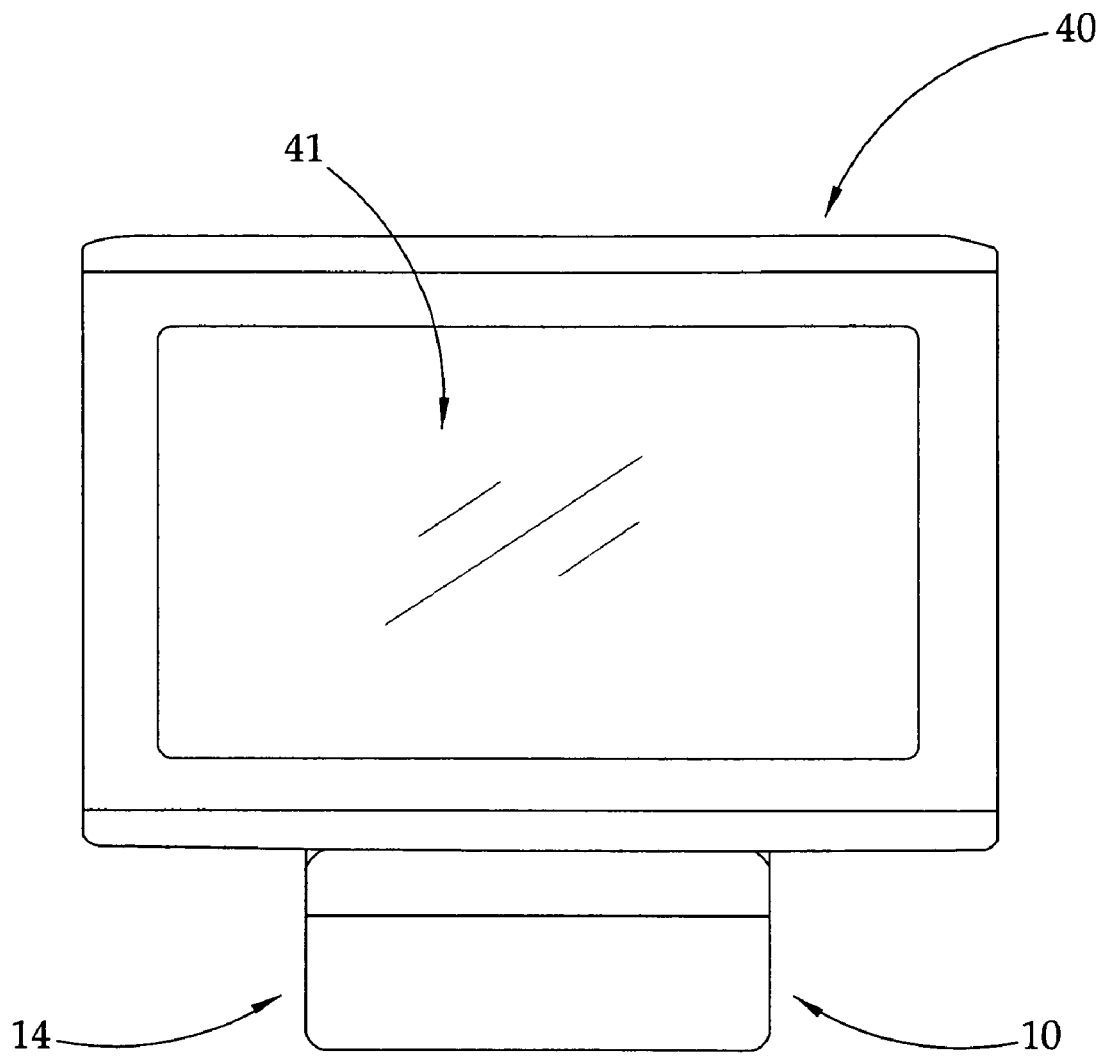
FIG. 1 is a front view of the mounting system having a radar detector and holding a GPS navigator.
Figure 2:
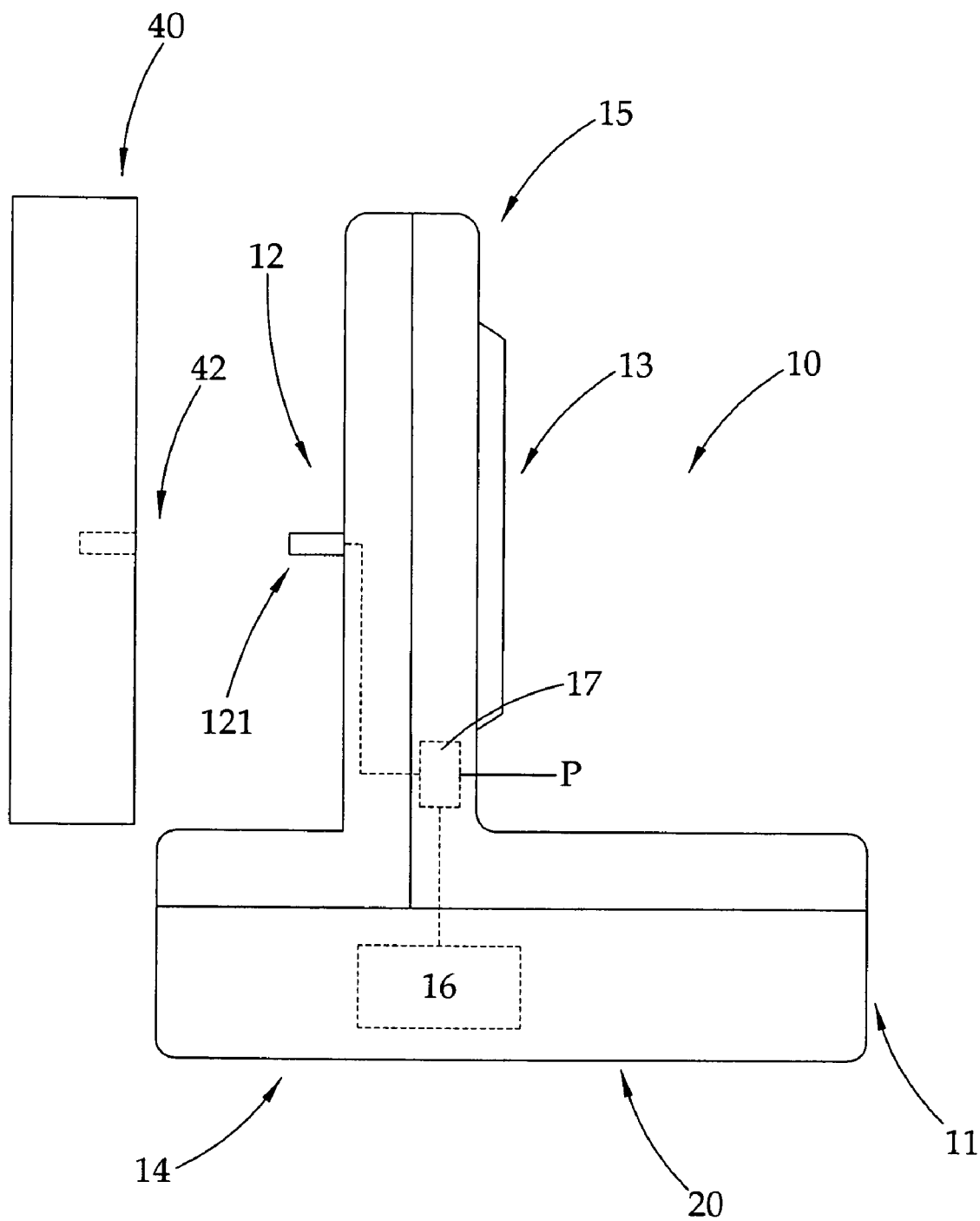
FIG. 2 is a side view of the mounting system having a radar detector and holding a GPS navigator.
Figure 3:
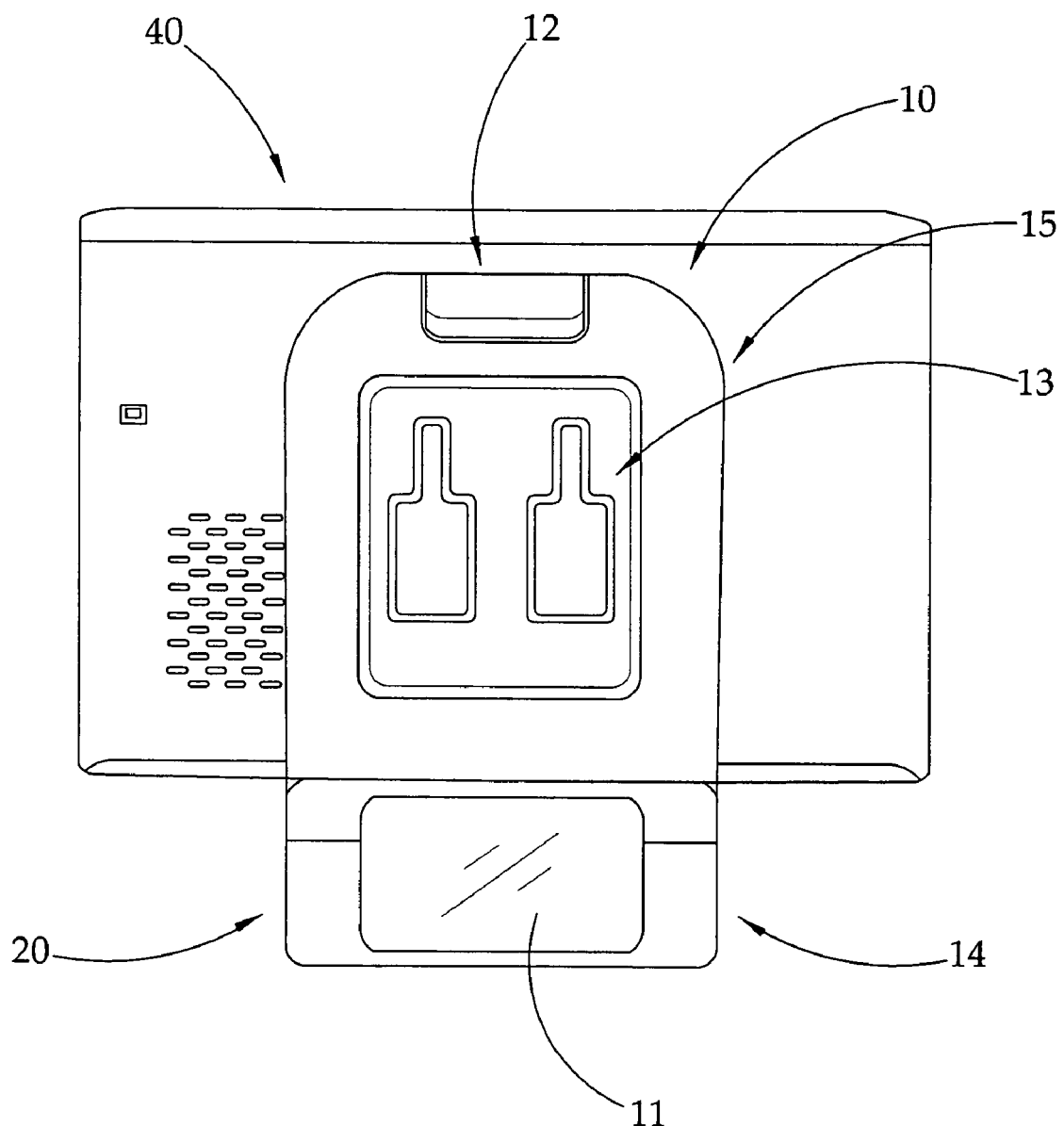
FIG. 3 is a back view of the mounting system having a radar detector and holding a GPS navigator.
Figure 4:
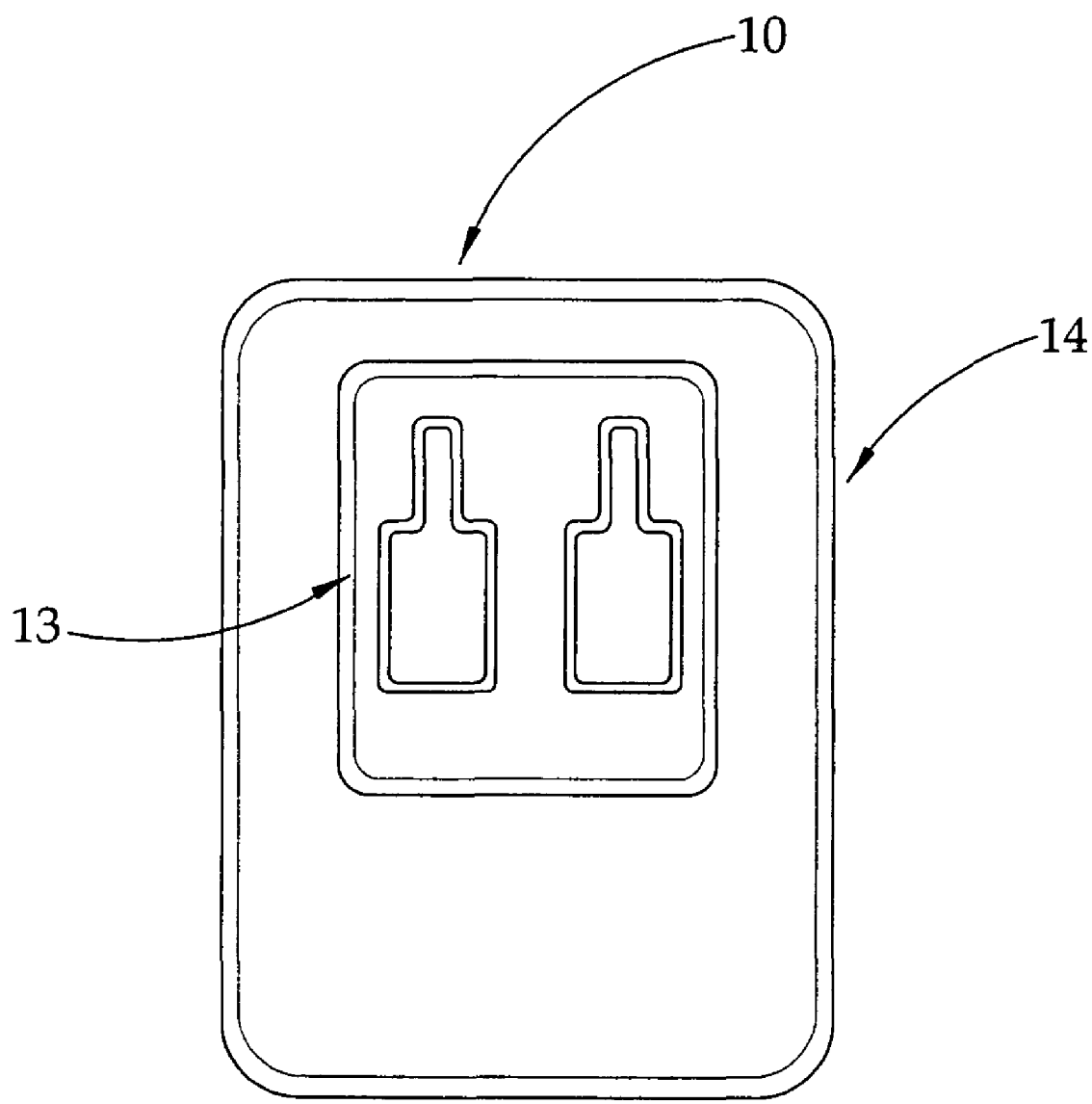
FIG. 4 is a bottom view of the mounting system having a radar detector and holding a GPS navigator.

Referring to FIGS. 1 to 4, a GPS system for GPS navigator with a radar detector comprises a frame 10. The GPS system also comprises a radar detector 20 seating inside the frame 10. The frame 10 comprises a window 11 provided at a first side of the frame 10, which allows the radar signal pass through to be detected by the radar detector 20. The window 11 has a predetermined width which enables the radar detector 20 to detect radar signals from a predetermine range of angle and give the driver relative information. The GPS navigator 40 is supported by the frame 10 at a second opposed side thereof, wherein a display 41 of the GPS navigator 40 is facing opposite to the window 11 of the frame 10.

The frame 10 also comprises a GPS holder 12 which removably holds the GPS navigator 40. The GPS navigator 40 is held in such a manner that the screen 41 of the GPS navigator 40 is facing outward of the frame 10, and is opposite to the window 11 of the frame 10. So when the screen 41 of the GPS navigator 40 is facing rearward to the driver, the window 11 of the radar detector 20 is facing forward of the vehicle. In other words, the when the GPS navigator 40 is supported at the frame 10, the window 11 of the frame 10 is facing opposite to the screen 41 of the GPS navigator 40. This will allow the radar detector 20 to detect radar signals in front of the vehicle. In a preferred embodiment, the GPS navigator 40 is clamped by the GPS holder 12 and can be easily removed. Therefore, it can be used as a portable navigator when the user is not driving.

Figure 5:
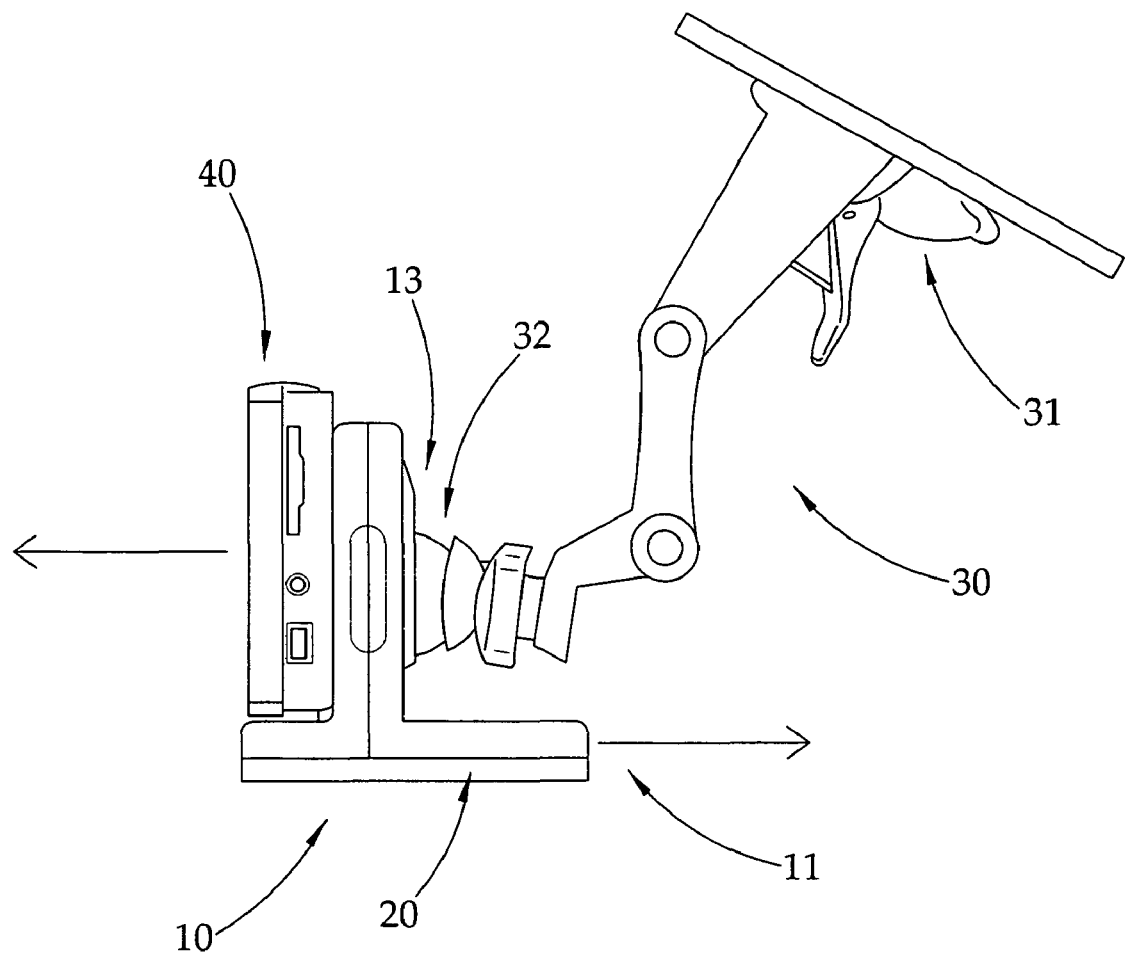
FIG. 5 is a perspective view of the mounting system attaching to the windshield.
Figure 6:
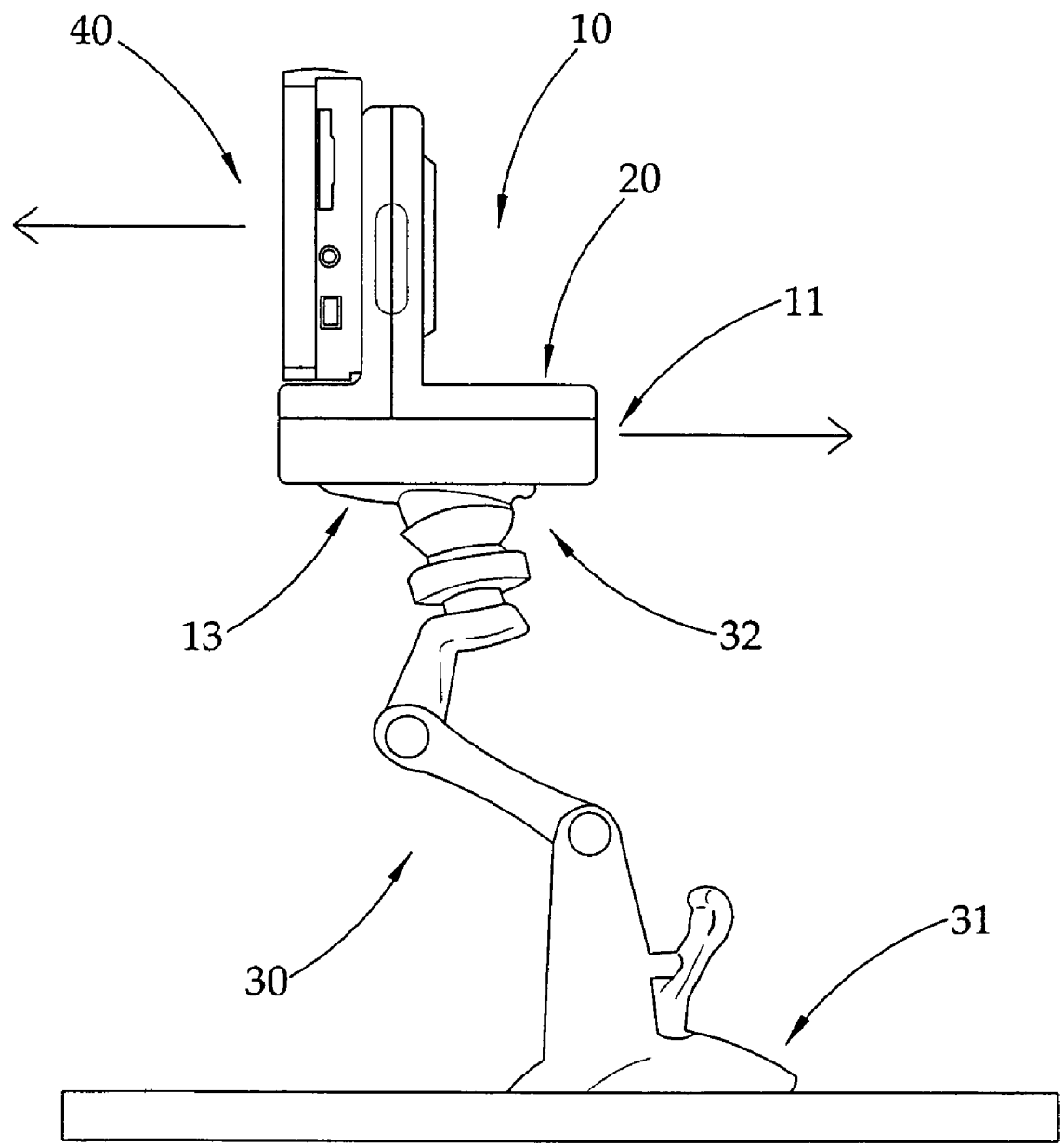
FIG. 6 is a perspective view of the mounting system attaching to the dashboard.

The GPS system also comprises a supporting arm 30. On one end of the supporting arm 30 as a suction end comprises an attaching element 31 which is removably attached to the mounting surface of the vehicle for fixing the GPS system in position. Referring to FIGS. 5 and 6, in a preferred embodiment, the attaching element 31 is a suction cup which can attach to the interior surface of the vehicle by vacuum. This surface could be the windshield or the dashboard of the vehicle. The attaching element 31 can be removed and attached again, so it is available to adjust the position of attaching. It is convenient for different drivers to position the GPS system as they wish. It is worth to mention that whatever the position of the GSP navigator 40 is set according to the preference of the driver, the window 11 of the frame 10 is always facing towards the windshield for detection of the radar detector 20.

Another end of the supporting arm 30, as a detachable attaching end, comprises an arm connector 32 which is connected with the frame 10. The frame 10 comprises one or multiple connector seats 13. The connector seats 13 is able to hooded up with the arm connector 32 of the supporting arm 30 to realized the mechanical connection of the frame 10 and the supporting arm 30. This connection of the frame 10 and the supporting arm 30 is removable and adjustable. The mounting angle of the frame 10 can be adjusted by the driver so that the driver can have a good access to the screen 41 of the GPS navigator 40.

To avoid the supporting arm 30 blocking the window 11 of the frame 10, in a preferred embodiment of the present invention, the frame 10 comprises two connector seats 13, one is above the radar detector 20, and one is beneath the radar, detector 20. Therefore, when the supporting arm 30 is attached to the windshield, and the frame 10 is suspendedly hanged by the supporting arm 30. The connector seat 13 over the window 11 is connected with the connector 32 of the supporting arm 30. When the supporting arm 30 is attached to the dashboard, and the frame 10 is supported by the supporting arm 30, the connecter seat 13 beneath the window 11 is connected with the connector 32 of the supporting arm 30. In such a manner, the supporting arm 30 will not be placed in front of the window 11, as a result radar signal can pass through window 11 with being blocked.

In a preferred embodiment, the frame 10 is in an "L" shape in the side view. The horizontal bottom portion 14 of the frame 10 seats the radar detector 20 inside. The window 11 is formed at the front end of the bottom portion 14. The window 11 is covered by radio transparent materials to allow the radar signals pass through. The receiver 21 of the radar detector 20 is behind the window 11. The width of the window 11 is preferably 50 mm, which enables a large arrange of view field of the radar detector 20, to detect radar signals from different directions.

The GPS holder 12 is located on the vertical portion 15 of the frame 10 to retain the GPS navigator 40 in a vertically standing manner. The vertical portion 15 is perpendicular to the bottom portion 14. On the side of the vertical portion 15 which is opposite to the window 11 of the bottom portion 14 located the GPS holder 12. The GPS navigator 40 is held by the GPS holder 12 and is resting on the vertical portion 15 and the bottom portion 14. On the other side of the vertical portion 15 a connector seat 13 is located. In this embodiment, the frame 10 comprises two connector seats 13, one is on the vertical portion 15, the other is on the bottom side of the bottom portion 14. The connector seat 13 is a socket adapted to hold the plug on the supporting arm 30 as the connector 32.

In other words, the radar detector 20 is received in the horizontal bottom portion 14 of the frame 10, wherein the window 11 is formed at a front end of the horizontal bottom portion 14 of the frame 10. The vertical portion 15 of the frame 10 supports the GPS navigator 40 in a vertically standing manner to ensure the display 41 of the GPS navigator 40 facing towards the driver.

As it is mentioned above, the GPS navigator 40 can be detached from the frame 10 to form the portable navigator. When the GPS navigator 40 is mounted to the frame 10, the GPS navigator 40 is communicatively linked to the radar detector 20 through the frame 10 such that the GPS navigator 40 not only displays GPS signal on the display 41 but also outputs radar signal detected by the radar detector 20. Accordingly, the GPS navigator 40 comprises a speaker unit for generating audio signal, such as "turn-by-turn voice directions, in responsive to the GPS signal received by the GPS navigator 40. When the GPS navigator 40 is mounted at the frame 10 to communicatively link to the radar detector 20, the speaker unit of the GPS navigator 40 can also generate an alert signal in responsive to the radar signal received by the radar detector 20.

In particularly, the first connector seat 13 is provided at a bottom side of the horizontal bottom portion 14 of the frame 10 at a position below the radar detector 20, and the second connector seat 13 is provided at a front side of the vertical portion 15 of the frame 10 at a position above the radar detector 20. Accordingly, the suction end of the supporting arm 30 is adapted for securely mounting at the mounting surface of the vehicle and the detachable attaching end of the supporting arm 30 is selectively coupling with one of the first and second connectors 13 to prevent the window 11 of the frame 10 from being blocked by the supporting arm 30.

Therefore, when the detachable attaching end of the supporting arm 30 is coupled with the first connector seat 13, the suction end of the supporting arm 30 is adapted for mounting at the dashboard as the mounting surface of the vehicle, and when the detachable attaching end of the supporting arm 30 is coupled with the second connector seat 13, the suction end of the supporting arm 30 is adapted for mounting at the windshield as the mounting surface of the vehicle.

In the embodiment, the GPS navigator 40 and the radar detector 20 are using their own power supply. It could battery or 12V DC car power. In another embodiment of the present invention, the GPS navigator 40 and the radar detector 20 use the power supplied by the GPS system.

In this embodiment, the frame 10 further comprises a power supply element 17 which is electrically coupling with both the GPS navigator 40 and the radar detector 20 and is adapted for electrically connecting with a 12V DC power outlet of the vehicle, so as to supply electrical energy to the GPS navigator and the radar detector at the same time.

The frame 10 further comprises a power connector 121 protruded from the vertical portion 15 to electrically couple with a terminal 42 of the GPS navigator 40 when the GPS navigator 40 is supported at the frame 10 so as to not only supply power to the GPS navigator 40 but also communicate the GPS navigator 40 with the radar detector 20. Accordingly, the power connector 121 is electrically extended from the power supply element 17 such that when the power supply element 17 is electrically connected to the power outlet of the vehicle, the GPS navigator 40 can draw the power from the vehicle. The GPS navigator further comprises a rechargeable battery 16 not only self-supplies power to the GSP navigator but also supplies power to the radar device when the power supply element 17 is disconnected with the power outlet of the vehicle.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A GPS apparatus for a vehicle having a mounting surface, comprising:

a frame having a window provided at a first side of said frame;

a GPS navigator supported by said frame at a second opposed side thereof, wherein a display of the GPS navigator is facing opposite to said window of said frame;

a radar detector received in said frame to align with said window thereof for detecting a radar signal; and a supporting arm detachably attaching said frame to said mounting surface of said vehicle, such that said display of said GPS navigator is rearwardly facing towards a driver while said radar detector is adapted for forwardly detecting said radar signal through said window of said frame.

2. The GPS apparatus, as recited in claim 1, further comprising a power supply element which is electrically coupling with both said GPS navigator and said radar detector and is adapted for electrically connecting with a power outlet of said vehicle, so as to supply electrical energy to said GPS navigator and said radar detector at the same time.

3. The GPS apparatus, as recited in claim 2, wherein said frame has a horizontal bottom portion receiving said radar detector therein and defining said window at a front end of said horizontal bottom portion, and a vertical portion upwardly extending from said horizontal bottom portion to support said GPS navigator at said vertical portion in a vertically standing manner so as to ensure said display of said GPS navigator facing towards said driver.

4. The GPS apparatus, as recited in claim 3, further comprising a first connector seat provided at a bottom side of said horizontal bottom portion of said frame at a position below said radar detector, and a second connector seat provided at a front side of said vertical portion of said frame at a position above said radar detector, wherein said supporting arm has a suction end adapted for securely mounting at said mounting surface of said vehicle and an opposed detachable attaching end selectively coupling with one of said first and second connectors to prevent said window of said frame from being blocked by said supporting arm, such that when said detachable attaching end of said supporting arm is coupled with said first connector seat, said suction end of said supporting arm is adapted for mounting at a dashboard as said mounting surface of said vehicle, and when said detachable attaching end of said supporting arm is coupled with said second connector seat, said suction end of said supporting arm is adapted for mounting at a windshield as said mounting surface of said vehicle.

5. The GPS apparatus, as recited in claim 4, wherein said suction end of said supporting arm comprises a suction cup adapted for detachably mounting at said mounting surface of said vehicle by means of suction.

6. The GPS apparatus, as recited in claim 5, wherein said GPS navigator is detachably mounted at said frame such that said GPS navigator forms a portable navigator when said GPS navigator is detached from said frame.

7. The GPS apparatus, as recited in claim 6, wherein said GPS navigator is communicatively linked to said radar detector through said frame such that said GPS navigator not only displays GPS signal on said display but also outputs radar signal detected by said radar detector.

8. The GPS apparatus, as recited in claim 7, wherein said frame comprises a power connector protruded therefrom to electrically couple with a terminal of said GPS navigator when said GPS navigator is supported at said frame so as to not only supply power to said GPS navigator but also communicate said GPS navigator with said radar detector.

9. The GPS apparatus, as recited in claim 8, wherein said GPS navigator further comprises a rechargeable battery not only self-supplies power to said GSP navigator but also supplies power to said radar device when said power supply element is disconnected with said power outlet of said vehicle.

10. The GPS apparatus, as recited in claim 4, wherein said frame comprises a power connector protruded therefrom to electrically couple with a terminal of said GPS navigator when said GPS navigator is supported at said frame so as to not only supply power to said GPS navigator but also communicate said GPS navigator with said radar detector.

11. The GPS apparatus, as recited in claim 4, wherein said GPS navigator further comprises a rechargeable battery not only self-supplies power to said GSP navigator but also supplies power to said radar device when said power supply element is disconnected with said power outlet of said vehicle.

12. The GPS apparatus, as recited in claim 3, wherein said GPS navigator is detachably mounted at said frame such that said GPS navigator forms a portable navigator when said GPS navigator is detached from said frame.

13. The GPS apparatus, as recited in claim 3, wherein said GPS navigator is communicatively linked to said radar detector through said frame such that said GPS navigator not only displays GPS signal on said display but also outputs radar signal detected by said radar detector.

14. The GPS apparatus, as recited in claim 2, wherein said GPS navigator further comprises a rechargeable battery not only self-supplies power to said GPS navigator but also supplies power to said radar device when said power supply element is disconnected with said power outlet of said vehicle.

15. The GPS apparatus, as recited in claim 1, wherein said frame has a horizontal bottom portion receiving said radar detector therein and defining said window at a front end of said horizontal bottom portion, and a vertical portion upwardly extending from said horizontal bottom portion to support said GPS navigator at said vertical portion in a vertically standing manner so as to ensure said display of said GPS navigator facing towards said driver.

16. The GPS apparatus, as recited in claim 15, further comprising a first connector seat provided at a bottom side of said horizontal bottom portion of said frame at a position below said radar detector, and a second connector seat provided at a front side of said vertical portion of said frame at a position above said radar detector, wherein said supporting arm has a suction end adapted for securely mounting at said mounting surface of said vehicle and an opposed detachable attaching end selectively coupling with one of said first and second connectors to prevent said window of said frame from being blocked by said supporting arm, such that when said detachable attaching end of said supporting arm is coupled with said first connector seat, said suction end of said supporting arm is adapted for mounting at a dashboard as said mounting surface of said vehicle, and when said detachable attaching end of said supporting arm is coupled with said second connector seat, said suction end of said supporting arm is adapted for mounting at a windshield as said mounting surface of said vehicle.

17. The GPS apparatus, as recited in claim 16, wherein said suction end of said supporting arm comprises a suction cup adapted for detachably mounting at said mounting surface of said vehicle by means of suction.

18. The GPS apparatus, as recited in claim 1, wherein said GPS navigator is detachably mounted at said frame such that said GPS navigator forms a portable navigator when said GPS navigator is detached from said frame.

19. The GPS apparatus, as recited in claim 1, wherein said GPS navigator is communicatively linked to said radar detector through said frame such that said GPS navigator not only displays GPS signal on said display but also outputs radar signal detected by said radar detector.

20. The GPS apparatus, as recited in claim 1, wherein said frame comprises a power connector protruded therefrom to electrically couple with a terminal of said GPS navigator when said GPS navigator is supported at said frame so as to not only supply power to said GPS navigator but also communicate said GPS navigator with said radar detector.

* * * * *